United States Patent
Binninger et al.

(10) Patent No.: US 11,121,409 B2
(45) Date of Patent: Sep. 14, 2021

(54) ELECTROCHEMICAL ENERGY STORAGE

(71) Applicant: International Business Machines Corporation, Armonk, NY (US)

(72) Inventors: Tobias Binninger, Zürich (CH); Teodoro Laino, Rueschlikon (CH); Federico Zipoli, Gattikon (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 111 days.

(21) Appl. No.: 16/406,404

(22) Filed: May 8, 2019

(65) Prior Publication Data

US 2020/0358134 A1 Nov. 12, 2020

(51) Int. Cl.
| | |
|---|---|
| *H01M 10/0585* | (2010.01) |
| *H01M 4/485* | (2010.01) |
| *H01M 4/58* | (2010.01) |
| *H01M 10/0562* | (2010.01) |
| *C01G 25/00* | (2006.01) |

(Continued)

(52) U.S. Cl.
CPC ...... *H01M 10/0585* (2013.01); *C01G 23/005* (2013.01); *C01G 25/006* (2013.01); *H01G 11/02* (2013.01); *H01G 11/30* (2013.01); *H01G 11/56* (2013.01); *H01G 11/86* (2013.01); *H01M 4/485* (2013.01); *H01M 4/5825* (2013.01); *H01M 10/0562* (2013.01); *C01P 2002/34* (2013.01); *C01P 2006/40* (2013.01); *H01M 2300/0071* (2013.01)

(58) Field of Classification Search
CPC ...... H01M 10/0585; H01M 4/5825; H01G 11/30; H01G 11/86; H01G 11/56; C01P 2006/40

See application file for complete search history.

(56) References Cited

U.S. PATENT DOCUMENTS

| | | | |
|---|---|---|---|
| 5,509,189 A * | 4/1996 | Tuller | B01D 53/326 29/623.1 |
| 9,755,272 B2 | 9/2017 | Gaben et al. | |
| 2015/0221973 A1* | 8/2015 | Upaddhyaya | H01M 4/0428 429/94 |

FOREIGN PATENT DOCUMENTS

| | | |
|---|---|---|
| IN | 201741013487 A | 10/2018 |
| WO | 2018143022 A1 | 8/2018 |

OTHER PUBLICATIONS

F. Lalère, J.B. Leriche, M. Courty, S. Boulineau, V. Viallet, C. Masquelier, V. Seznec. "An all-solid state NASICON sodium battery operating at 200 ° C." Journal of Power Sources, vol. 247, pp. 975-980. (Year: 2014).*

(Continued)

*Primary Examiner* — Magali P Slawski
*Assistant Examiner* — Jessie L. Walls
(74) *Attorney, Agent, or Firm* — Cantor Colburn LLP; Daniel Morris

(57) ABSTRACT

An electrochemical energy storage device is provided. The device may include a solid-state anode layer. The device may comprise a solid-state electrolyte layer. Further, the device may comprise a solid-state cathode layer. At least two adjacent ones out of the solid-state anode layer, the solid-state electrolyte layer, and the solid-state cathode layer may form a solid-state single-crystal with varying chemical compositions between the related layers. The solid-state electrolyte layer may have an ionic conductivity at room temperature higher than $10^{-6}$ S/cm.

3 Claims, 3 Drawing Sheets

(51) Int. Cl.
   *C01G 23/00*    (2006.01)
   *H01G 11/30*    (2013.01)
   *H01G 11/02*    (2013.01)
   *H01G 11/86*    (2013.01)
   *H01G 11/56*    (2013.01)

(56) References Cited

OTHER PUBLICATIONS

Yue Deng, Christopher Eames, Long H. B. Nguyen, et al. "Crystal Structures, Local Atomic Environments, and Ion Diffusion Mechanisms of Scandium-Substituted Sodium Superionic Conductor (NASICON) Solid Electrolytes." Chem. Mater., 30, 8, 2618-2630. Publication Date: Mar. 23, 2018. (Year: 2018).*

Anantharamulu, N., Koteswara Rao, K., Rambabu, G. et al. A wide-ranging review on Nasicon type materials. J Mater Sci 46, 2821-2837 (Year: 2011).*

J.P. Boilot, Ph. Colomban, G. Collin, Stoichiometry-structure-fast ion conduction in the nasicon solid solution, Solid State Ionics, vols. 28-30, Part 1, 1988, pp. 403-410, ISSN 0167-2738. (Year: 1988).*

Minghua Zhou, Aftab Ahmad, Synthesis, processing and characterization of nasicon solid electrolytes for CO2 sensing applications, Sensors and Actuators B: Chemical, vol. 122, Issue 2, 2007, pp. 419-426, ISSN 0925-4005. (Year: 2007).*

Sun et al., "High-Voltage All-Solid-State Na-Ion-Based Full Cells Enabled by All NASICON-Structured Materials", ACS Appl. Mater. Interfaces 2019, 11, 24192-24197 (Year: 2019).*

Aslani, "Electrochemical Double Layer Capacitors (Supercapacitors)," http://large.stanford.edu/courses/2012/ph240/aslani1/ (retrieved Apr. 12, 2019), 3 pages.

Bharathi et al., "Effect of oxygen pressure on structure and ionic conductivity of epitaxial Li 0.33 La 0.55 TiO 3 solid electrolyte thin films produced by pulsed laser deposition," RSC Advances 6.66 (2016): 61974-61983.

Chen et al., "Challenges and Perspectives for NASICON-Type Electrode Materials for Advanced Sodium-Ion Batteries," Advanced Materials 29.48 (2017): 1700431, 21 pages.

Han et al., "A Battery Made from a Single Material," Advanced Materials 27.23 (2015): 3473-3483.

Kataoka et al., "Lithium-ion conducting oxide single crystal as solid electrolyte for advanced lithium battery application," Scientific Reports 8.1 (2018): 9965, 9 pages.

Kim et al., "Hetero-epitaxial growth of Li0. 17La0. 61TiO3 solid electrolyte on LiMn2O4 electrode for all solid-state batteries," Solid State Ionics 262 (2014): 578-581.

Rosciano et al., "Towards a lattice-matching solid-state battery: synthesis of a new class of lithium-ion conductors with the spinel structure," Physical Chemistry Chemical Physics 15.16 (2013): 6107-6112.

* cited by examiner

300

310  growing a solid-state anode layer 320  growing a solid-state electrolyte layer 330  growing a cathode layer

FIG. 3

ELECTROCHEMICAL ENERGY STORAGE

BACKGROUND

The invention relates generally to an electrochemical energy storage device, and more specifically, to a homo-epitaxial solid-state battery. The invention relates further to a method for manufacturing an electrochemical energy storage device.

There exist huge and constantly growing businesses for batteries, for example in electric vehicles, portable electronic devices, renewable energy storage, Internet of Things (IoT), Internet of Body (IoB). Further applications for batteries may be nanoscale energy storage and integrated circuits.

Current battery technology disadvantages can require long charging times and can allow only low power output with complex design and difficult miniaturization.

Electrochemical energy storage devices may have to be optimized with respect to interface resistance effects due to hindrance of ion transport from one layer to another in the electrochemical energy storage device. In addition, it is desired to form an electrochemical energy storage device with reduced mechanical instability potentially caused by structural incompatibilities between adjacent layers. Furthermore, it is desired to form an electrochemical energy storage device with higher power output.

Thus, there may be a demand to provide concepts for an electrochemical energy storage device with reduced interface resistance, better mechanical stability and reduced grain boundary resistance.

SUMMARY

According to one aspect of the present invention, an electrochemical energy storage device is provided. The electrochemical energy storage device can be a homo-epitaxial solid-state battery. The device can include a solid-state anode layer, a solid-state electrolyte layer and a solid-state cathode layer. At least two adjacent ones out of the solid-state anode layer, the solid-state electrolyte layer, and the solid-state cathode layer can form a solid-state single-crystal with varying chemical compositions between the related layers. The solid-state electrolyte layer can have an ionic conductivity higher than $10^{-6}$ S/cm at room temperature, where "S" stands for "Siemens", which is the inverse of "Ohm" (S=1/Ohm).

According to another aspect of the present invention, a method for manufacturing an electrochemical energy storage device is provided. The method may comprise growing a solid-state anode layer and growing a solid-state electrolyte layer. The method may also comprise growing a solid-state cathode layer. The manufacturing may be performed in this order, one layer atop the earlier grown layer, or, in particular, in the opposite order, starting with the cathode layer. At least two adjacent ones out of the solid-state anode layer, the solid-state electrolyte layer, and the solid-state cathode layer is grown as a solid-state single-crystal with varying chemical compositions between the related layers. The solid-state electrolyte layer may have an ionic conductivity at room temperature higher than $10^{-6}$ S/cm.

The proposed electrochemical energy storage device may offer multiple advantages and technical effects. For example, the use of a single crystal may diminish the grain boundary resistance effect and interface resistance effect. Furthermore, due to the use of a single crystal, there is no incompatibility between adjacent layers.

The single crystal layers of the device can be oriented in such a way that the crystal lattice direction with the highest ion conductivity, i.e. the direction of the best ion conduction channels, is aligned vertically to the plane of the electrode and electrolyte layers. In this way, the lowest resistance is obtained across the electrode and electrolyte layers. This may furthermore enable the use of crystal structures with strongly non-isotropic conductivities.

In comparison to Li-ion (or Na-ion) batteries with many material and phase interfaces, the electrochemical energy storage device, as disclosed herein, may have higher ion transport and charging, as well as discharging, times may be reduced. Furthermore, the design complexity may be lowered significantly.

In comparison to thin-film all-solid-state batteries, the electrochemical energy storage device, as disclosed herein, may have no grain boundaries within the films and no electrode-electrolyte structural interface. Thus, the electrochemical energy storage device, as disclosed herein, may have a higher ion transport and shorter charging times therefrom. During discharging, the inner resistance may be lower, thus higher peak currents may be possible. Further, the mechanical compatibility may be better.

In comparison to hetero-epitaxial thin-film all-solid-state batteries, the electrochemical energy storage device, as disclosed herein, may be formed without a resistive layer at electrode-electrolyte interface. Thus, the electrochemical energy storage device, as disclosed herein, may have a lower resistance and faster charging/discharging compared to the hetero-epitaxial thin-film all-solid-state batteries.

In comparison to batteries with liquid electrolytes that generally are flammable, solid-state batteries may be safer because they cannot have a leak, and because the solid-state electrolyte is not flammable. Furthermore, significantly thinner solid-state electrolyte layers in comparison to liquid electrolyte layers are feasible with the consequence of possibly reduced resistance.

Additionally, a low ion transfer resistance may result from a smooth transition between electrodes (solid-state anode and cathode, respectively) and the solid-state electrolyte with ion conduction channels in the crystal structure stretching across all single-crystal layers without channel blocking.

The electrochemical energy storage device may be used in integrated electronic devices at micro- or nano-sized level, for example for IoT and IoB.

In the following, additional embodiments of the inventive concept will be described.

According to embodiments of the device, the energy storage device may be a Li-ion solid-state battery, a Na-ion solid-state battery, or an H-ion solid-state battery/supercapacitor. Thus, the battery is not limited to just one option, but may be based on different material mixes.

According to embodiments of the device, the solid-state anode layer, the solid-state electrolyte layer, and the solid-state cathode layer may be layers of the same solid-state single-crystal with each having a different chemical composition. This may allow manufacturing the device easily and without significant movements between production areas or reactors.

According to embodiments of the device, a base material of at least two adjacent layers of the anode layer, the electrolyte layer, and the cathode layer may comprise a NASICON crystal structure, in particular, Natrium (Na) Super Ion Conductor. This well researched crystal structure may form a solid basis for the here proposed concept.

According to a further embodiment of the device, the base material comprising the NASICON crystal structure may be $Na_{1+x}Zr_2(PO_4)_{3-x}(SiO_4)_x$, in particular a single-crystal NASICON battery, x can be between 0 and 3. X can also be an integer number, in particular 0, 1, 2 or 3 (alternatively, a float value). Thus, a variety of compositions may be used according to specifications required for a certain use-case.

According to an advantageous embodiment of the device, the anode layer may be doped with a first redox active transition metal. The cathode layer may be doped with the first redox active transition metal. The cathode layer may be doped with a second redox active transition metal which is different from the first redox active transition metal. Thus, by doping individual layers the underlying crystal structure may only be disturbed by a small amount, but will not change significantly.

According to an alternative embodiment of the device, a base material of at least two adjacent layers of the anode layer, the electrolyte layer, and the cathode layer may comprise a Perovskite crystal structure. Hence, the proposed concept is not only limited to the NASICON crystal structure. Alternative implementations concepts may also be used.

According to embodiments of the device, the base material comprising the Perovskite crystal structure may be $Li_{2-3x}La_xTiO_3$, wherein x may lie between ½ and ⅔. Also here, different manufacturing alternatives—depending on a variety of different limiting factors—may be used.

According to embodiments of the device, the anode layer may be doped with at least one of a first redox active transition metal—e.g., V, Cr, Mn, Fe, Co, Ni, Y, Zr, Nb, Mo, Hf, Ta, W, Ce, or Pr. Depending on the first transition metal dopant, co-doping with a first alkaline earth metal, e.g., Be, Mg, Ca, Sr, or Ba, may be beneficial for compensation of charge or lattice strain. Further, the cathode layer may be doped with the first redox active transition metal, the first alkaline earth metal, a second redox active transition metal, and/or a second alkaline earth metal. These doping elements may be available without any difficulties and at reasonable cost.

According to embodiments of the method, at least two adjacent layers of the anode layer, the electrolyte layer, and the cathode layer may be grown epitaxially using at least one of LPE, CVD, MOCVD, MBE, and PLD. Hence, a large variety of well-established single-crystal-layer production methods may be used. Chemical composition variations across the different functional layers can be obtained by switching on/off suitable dopant metal targets during the single-crystal layer growth process, or by adding suitable dopant metal precursors into the process gas/liquid volume. No new manufacturing facilities are required for the here proposed battery concept.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
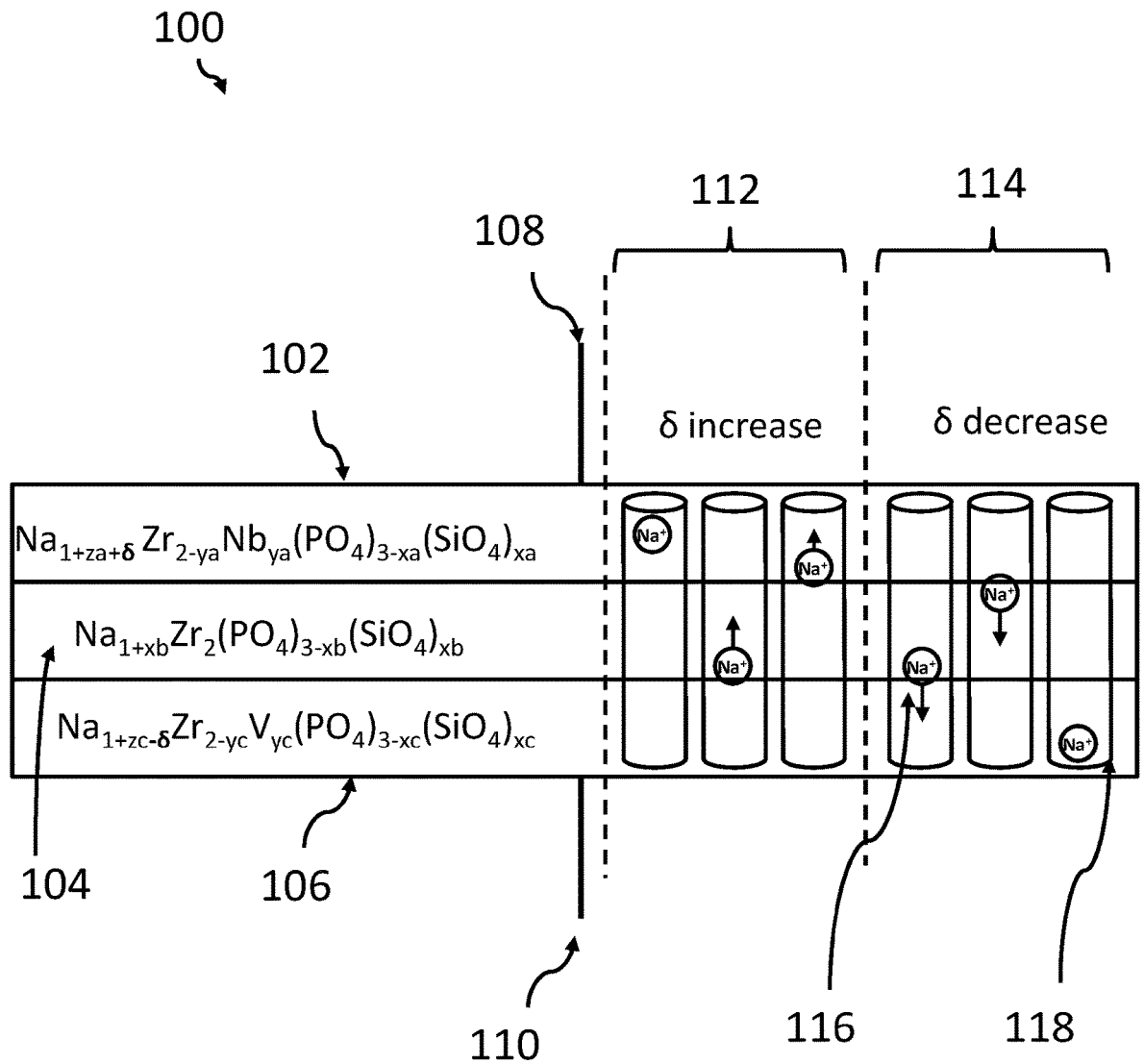

Embodiments of the invention will be described, by way of example only, and with reference to the following drawings:

FIG. 1 schematically shows an illustration of an embodiment of the inventive electrochemical energy storage device.

Figure 2:
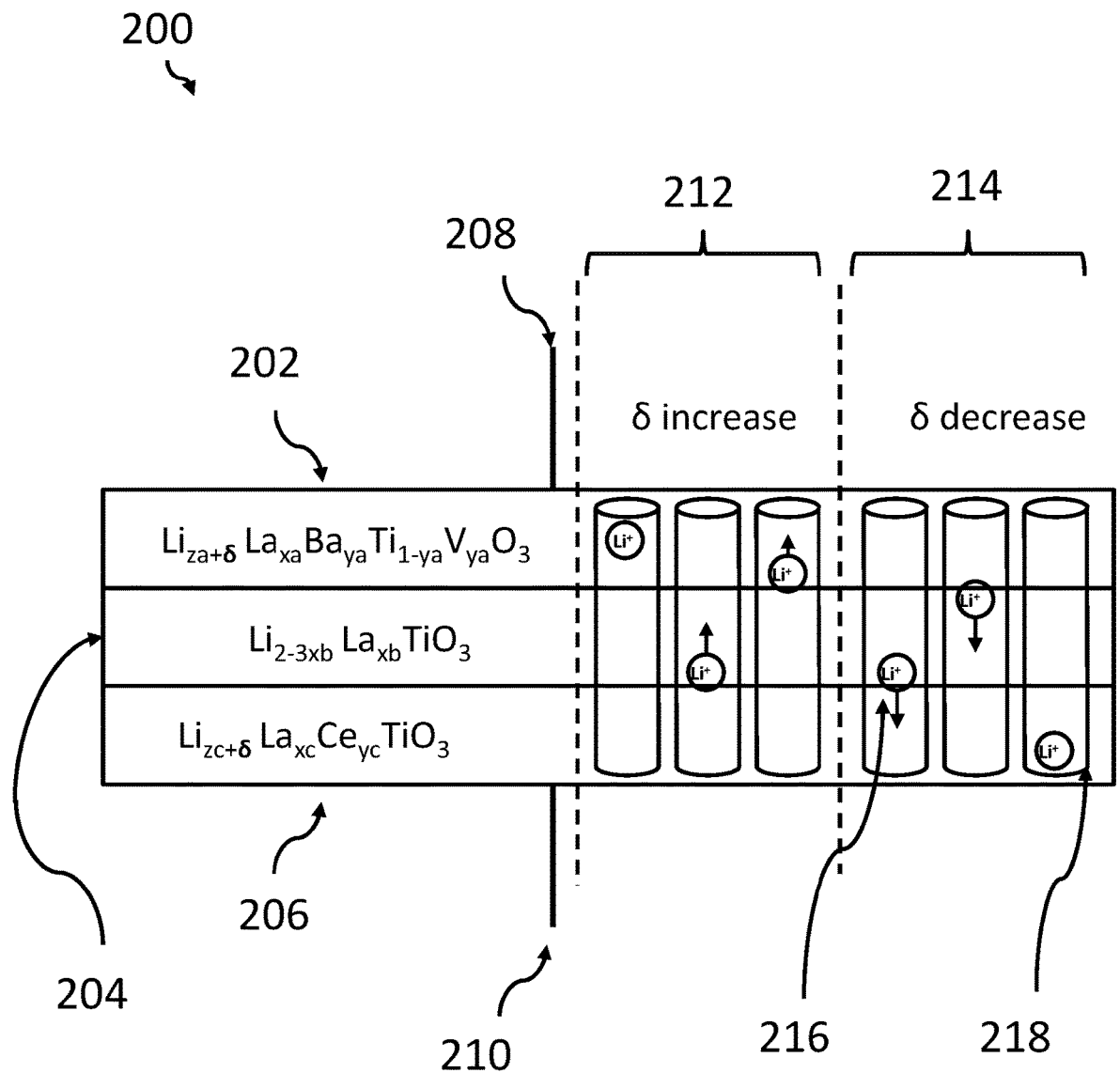

FIG. 2 schematically shows an illustration of an embodiment of the inventive electrochemical energy storage device.

FIG. 3 shows a block diagram of an embodiment of the inventive method for manufacturing an electrochemical energy storage device.

DETAILED DESCRIPTION

In the context of this description, the following conventions, terms and/or expressions may be used:

The term "electrochemical energy storage device" may basically denote a battery or a supercapacitor for storage of electrical energy. The device may be rechargeable. Thus, a plurality of charge and discharge cycle may be applied to the energy storage device.

The term "solid-state electrolyte layer" may denote a layer of solid material for example fast ion conductors. Thus, the electrolyte layer may not require any liquid materials. This may improve the device security and usability.

The term "a solid-state anode layer" may denote a layer of solid—in particular single-crystal—material at which an oxidation reaction occurs during discharging. The term "solid-state cathode layer" may denote a layer of solid material at which a reduction reaction occurs during discharging. Elemental substitution in the solid-state anode and cathode layers, respectively, may result in a low- and high-potential redox-couple, respectively.

The solid-state electrolyte layer may be referred to as a basis with high ionic conductivity. The redox active elements which may be incorporated in the electrode layers (which then form the solid-state anode and cathode, respectively) may decrease the ionic conductivity of the respective layers. The solid-state cathode layer and the solid-state anode layer may then be used as corresponding electrodes—eventually with additional metal contact (current collector) layers—of the electrochemical energy storage device.

The term "solid-state single-crystal" may denote a solid-state monolithic single crystal without structural interfaces between homo-epitaxial layers of the solid-state monolithic single crystal. It may denote monolithic single-crystals of inorganic structures, or of organic structures, or of metal-organic framework (MOF) structures. The term "solid-state single-crystal" may furthermore include crystalline films that contain multiple single crystal domains, where the single crystalline order is maintained across the entire thickness of the film, and where the lateral size of the single crystal domains is sufficiently large that the domain boundaries do not significantly influence the device performance.

The term "varying chemical compositions" may denote a gradient of chemical compositions between the respective layers of the electrochemical energy storage device. Thus, there may be a different chemical composition in every single layer of the electrochemical energy storage device. Interfaces between adjacent layers are typically not abrupt, but the corresponding compositions change smoothly within a transition region with a locally defined thickness.

The term "ionic conductivity" may denote a conductivity of ions in the solid-state electrolyte layer. In particular, the solid-state electrolyte layer may have an ionic conductivity at room temperature which is higher than $10^{-6}$ S/cm, or $10^{-5}$ S/cm, or $10^{-4}$ S/cm, or $10^{-3}$ S/cm. This may depend on a particular implementation. However, although the device may be operated at higher temperatures (i.e., higher than room temperature) it may be useful to specify its ionic conductivity at room temperature (It should also be noted that the ionic conductivity increases comparably strongly with raising temperatures).

The term "NASICON crystal structure" may denote a crystal structure having the same structure as the Na Super Ionic Conductor (NASICON) with the chemical formula $Na_{1+x}Zr_2Si_xP_{3-x}O_{12}$, $0<x<3$. It may denote similar compounds, wherein Na, Zr and/or Si may be replaced by isovalent elements. It may also denote compounds with the same structure that comprise Li instead of Na as mobile species. NASICON compounds may have high ionic conductivities, on the order of $10^{-3}$ S/cm and better at room temperature.

The term "first redox active transition metal" may denote metallic elements that serve as a transition between the main group elements of the periodic table and which are active for reduction and/or oxidation. For example, following transition metals may be used for doping: titanium (Ti), vanadium (V), chromium (Cr), manganese (Mn), iron (Fe), cobalt (Co), nickel (Ni), yttrium (Y), zirconium (Zr), niobium (Nb), molybdenum (Mo), hafnium (Hf), tantalum (Ta), tungsten (W), lanthanum (La), cerium (Ce), praseodymium (Pr). The term "redox" may describe the ability to perform a reduction or oxidation reaction.

The term "second redox active transition metal" may denote the same redox active transition metal as the first redox active transition metal, and may also denote another one of redox active transition metals out of titanium (Ti), vanadium (V), chromium (Cr), manganese (Mn), iron (Fe), cobalt (Co), nickel (Ni), yttrium (Y), zirconium (Zr), niobium (Nb), molybdenum (Mo), hafnium (Hf), tantalum (Ta), tungsten (W), lanthanum (La), cerium (Ce), praseodymium (Pr).

The term "Perovskite crystal structure" may denote a crystal structure having the same structure as the calcium titanium oxide mineral composed of CaTiO3.

The term "first alkaline earth metal" may denote an alkaline earth metal out of the list of beryllium (Be), magnesium (Mg), calcium (Ca), strontium (Sr), and barium (B a).

The term "second alkaline earth metal" may denote another alkaline earth metal which is the same alkaline earth metal as the first alkaline earth metal, or a different one out of the list of beryllium (Be), magnesium (Mg), calcium (Ca), strontium (Sr), and barium (B a).

In the following, a detailed description of the figures will be given. All instructions in the figures are schematic. Firstly, a block diagram of an embodiment of the inventive electrochemical energy storage device is given. Afterwards, further embodiments, as well as embodiments of the method for manufacturing an electrochemical energy storage device, will be described.

FIG. 1 shows schematically an illustration of an embodiment of the inventive electrochemical energy storage device 100. The electrochemical energy storage device 100 is in a NASICON crystal structure. The electrochemical energy storage device 100 schematically illustrates a homo-epitaxial solid-state battery with a solid-state anode 102, a solid-state electrolyte 104, also called SSE herein, and a solid-state cathode 106. The solid-state anode 102, the SSE 104, and the solid-state cathode 106 are formed from one and the same monolithic single crystal with spatially varying chemical compositions between the different functional layers, namely the solid-state anode 102, the SSE 104 and the solid-state cathode 106. In FIG. 1, Na+channels are indicated by schematic cylinders 116 and 118 in sections 112 and 114, and they extend throughout all three layers 102, 104 and 106. The absence of structural interfaces due to the single crystal structure of the electrochemical energy storage device 100 leads to better Na+ transport, both, within and across all three functional layers 102, 104 and 106. The NASICON crystal structure in FIG. 1 shows exemplary the elemental substitution of zirconium (Zr) by niobium (Nb) and vanadium (V) in the solid-state anode 102 and the solid-state cathode 106, respectively. The result is a low- and a high-potential redox couple, respectively. The charging process can be performed by applying a voltage to the respective electrical contacts 108 and 110. The electrical contacts 108 and 110 may be metallic contact layers on top the respective layers to be connected. Therefore, e.g., aluminium (Al) or copper (Cu) may be used. These layers may serve as current collectors. The discharging process can be performed by connecting a load—e.g., a resistive element—between the respective electrical contacts 108 and 110 which may be implemented as entire metallic contact layers atop the cathode and anode (not shown). During the charging process schematically shown in section 112, the Na+ ions wander to the solid-state anode 102, which is reversed in the discharge process, as illustrated in section 114, wherein the Na+ ions wander to the solid-state cathode 106.

The single-crystal battery, as schematically shown in FIG. 1, is a monolithic Na-ion battery based on the NASICON crystal structure, in particular the solid-state electrolyte $Na_{1+x}Zr_2(PO_4)_{3-x}(SiO_4)_x$.

A NASICON SSE composition, in particular $Na_{1+x}Zr_2(PO_4)_{3-x}(SiO_4)_x$ (x=0 to 3), may have for x=(17/6)=2.833 a reduction potential: $E_{red}$=-0.4 Vvs. Na metal reference, and an oxidation potential: $E_{ox}$=+3.84 Vvs. Na metal reference.

A NASICON electrode composition being Nb-doped, in particular $Na_{1+z}Zr_{2-y}Nb_y(PO_4)_{3-x}(SiO_4)_x$ (x=0 to 3, y=0 to 2, z=0 to 3), may have for x=(17/6)=2.833; y=(1/6)=0.167 a first redox potential: $E_{eq}$=+0.16 Vvs. Na metal reference, and a second redox potential: $E_{eq}$=+0.75 Vvs. Na metal reference.

A NASICON electrode composition being V-doped, in particular $Na_{1+z}Zr_{2-y}V_y(PO_4)_{3-x}(SiO_4)_x$ (x=0 to 3, y=0 to 2, z=0 to 3), may have for x=(17/6)=2.833; y=(1/6)=0.167 a first redox potential: Eeq=+1.69 Vvs. Na metal reference, and a second redox potential: $E_{eq}$=+2.39 Vvs. Na metal reference.

A NASICON electrode composition being Mn-doped NASICON, in particular $Na_{1+z}Zr_{2-y}Mn_y(PO_4)_{3-x}(SiO_4)_x$ (x=0 to 3, y=0 to 2, z=0 to 3), may have for x=(17/6)=2.833; y=(1/6)=0.167 a redox potential: $E_{eq}$=+2.54 Vvs. Na metal reference.

Based on these results, the exemplary NASICON single crystal battery 100 in FIG. 1 with Nb-doped anode layer and V-doped cathode layer may deliver a total cell voltage of U=2.23 V (=2.39 V−0.16 V).

Additional NASICON electrode materials may be one or more of the following list: $Na_3V_2(PO_4)_3$, $Na_2FeTi(PO_4)_3$, $NaTi_2(PO_4)_3$, and $Na_3MnTi(PO_4)_3$.

More details and aspects are mentioned in connection with the embodiments described above or below. The embodiment shown in FIG. 1, may comprise one or more optional additional features corresponding to one or more aspects mentioned in connection with the proposed concept or one or more embodiments described below (e.g. FIGS. 2, 3). It may also be mentioned that the additional factors a, b, c shown in FIG. 1 and also in FIG. 2 indicate that the stoichiometries can be different in the different layers.

FIG. 2 schematically shows an illustration of an embodiment of the inventive electrochemical energy storage device 200. The electrochemical energy storage device 200 in FIG. 2 is in a Perovskite structure. The electrochemical energy storage device 200 schematically illustrates a homo-epitaxial solid-state battery with a solid-state anode 202, a solid-state electrolyte 204, also called SSE herein, and a solid-state cathode 206. The solid-state anode 202, the SSE 204, and the solid-state cathode 206 are formed from one and the same monolithic single crystal with spatially varying chemical compositions between the different functional layers, namely the solid-state anode 202, the SSE 204 and the solid-state cathode 206. In FIG. 2, Li+ channels are indicated by schematic cylinders 216 and 218 in sections 212 and 214 and they extend throughout all three layers 202, 204 and 206. The absence of structural interfaces between the layers due to the single crystal structure of the electrochemical energy storage device 200 leads to better Li+ transport, both, within and across all three functional layers 202, 204 and 206. The Perovskite crystal structure in FIG. 2 exemplary shows the elemental supplementation of Ba and V in the solid-state anode 202, and Ce in the solid-state cathode 206, respectively. The result is a low- and a high-potential redox couple, respectively. The charging process can be performed by applying a voltage to the respective electrical contacts 208 and 210 (e.g., entire Al or Cu contact layers as current collectors, not shown). The electrical contacts 208 and 210 may be metallic contact layers on top the respective layers to be connected. Therefore, Al or Cu may be used. These layers may serve as current collectors. The discharging process (δ decrease) can be performed by putting a load between the respective electrical contacts 208 and 210. During the charging process (δ increase) schematically shown in section 212, the Li+ ions wander to the solid-state anode 202, which is reversed in the discharge process, as illustrated in section 214, wherein the Li+ ions wander to the solid-state cathode 206.

In FIG. 2, the monolithic electrochemical energy storage device 200 is a Li-ion battery based on the Perovskite structure, in particular single crystal growth of epitaxial $Li_{0.33}La_{0.55}TiO_3$ (LLTO) solid-state electrolyte films by, for example, pulsed laser deposition (PLD).

An LLTO SSE composition being $Li_{2-3x}La_xTiO_3$ (x between ½ and ⅔) may have, for x=(5/9)=0.556: $Li_{0.333}La_{0.556}TiO_3$, a reduction potential: Ered=+2.32 V vs. Li metal reference, and an oxidation potential: $E_{ox}$=+4.12 V vs. Li metal reference.

An LLTO electrode composition being Ce-doped, in particular $Li_zLa_xCe_yTiO_3$ (x=0 to 1, y=0 to 1, z=0 to 1, such that x+y+z<=1) may have for x=(1/2)=0.5 and y=(1/18)=0.056 a first redox potential: $E_{eq}$=+2.84 V vs. Li metal reference, and a second redox potential: $E_{eq}$=+3.49 V vs. Li metal reference.

An LLTO electrode composition being (Fe+Ba)-doped, in particular $Li_zLa_xBa_yTi_{1-y}Fe_yO_3$ (x=0 to 1, y=0 to 1, z=0 to 1, such that x+y+z<=1) may have for x=(5/9)=0.556 and y=(1/18)=0.056 a first redox potential: $E_{eq}$=+1.54 V vs. Li metal reference, and a second redox potential: $E_{eq}$=+3.45 V vs. Li metal reference.

An LLTO electrode composition being (V+Ba)-doped, in particular $Li_zLa_xBa_yTi_{1-y}V_yO_3$ (x=0 to 1, y=0 to 1, z=0 to 1, such that x+y+z<=1) may have for x=(5/9)=0.556; y=(1/18)=0.056 a redox potential: $E_{eq}$=+2.26 V vs. Li metal reference.

Based on these results, the exemplary Perovskite crystal single crystal battery 200 in FIG. 2 with (V+Ba)-doped anode layer and Ce-doped cathode layer may deliver a total cell voltage of U=1.23 V (=3.49 V−2.26 V).

Other dopants such as Cr, Mn, Pr, Tb may also be used for the homo-epitaxial solid-state battery 200.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIG. 1) or below (e.g. FIG. 3).

FIG. 3 shows a block diagram of an embodiment of the inventive method for manufacturing an electrochemical energy storage device.

The method 300 comprises growing, 310, a solid-state anode layer, in particular on a substrate which may have been covered by a metallic layer as electrode. Additionally, the required doping may be performed as part of the growth process directly.

The method further comprises growing, 320, a solid-state electrolyte layer. Here, the dopants may be switched of during the growth of the crystal structure. The method further comprises growing, 330, a solid-state cathode layer, again with the appropriate dopant material; additionally, a metal layer may be deposited atop the top layer of the crystal structure as second electrode for the battery. The manufacturing is illustrated to be performed in this order but may also be performed in an order which is the other way around. At least two adjacent ones out of the solid-state anode layer, the solid-state electrolyte layer, and the solid-state cathode layer are grown as one solid-state single-crystal with varying chemical compositions between the related layers. In particular all of the layers may be grown as the solid-state single-crystal with varying chemical compositions between the related layers. The solid-state electrolyte layer has an ionic conductivity at room temperature higher than $10^{-6}$ S/cm.

The method 300 may further comprise the use of a suitable substrate for the deposition 310 of the first layer. It may furthermore comprise the removal of this substrate by etching or polishing at an intermediate stage or after completion of the process 310-320-330. In addition, the method 300 may comprise the deposition of metallic contact layers on the outer surfaces of the anode layer and/or cathode layer at an intermediate stage or after completion of the process 310-320-330.

The anode, electrolyte, and cathode layers may form homo-epitaxial layers with identical homogeneous crystal structure and orientation throughout all layers. The battery function may be provided by redox-active elements incorporated into the solid-state anode layer and the solid-state cathode layer, respectively. For example, the SSE layer does not contain elements with a redox-transition within the potential range defined by the equilibrium redox potentials of the solid-state anode and solid-state cathode dopants, respectively. The entire battery may be formed by one and the same monolithic single crystal. In this way, no structural interfaces may exist between the respective layers and therefore, interface layers may be avoided. The interface between solid-state anode and solid-state electrolyte as well as the interface between solid-state cathode and the solid-state electrolyte may be merely formed by a gradient in the redox-dopant concentrations of the solid-state anode and solid-state cathode, respectively. Further, ion channels of the crystal structure may extend throughout all functional layers of the battery without interfacial blocking. In this way, ions can move within the same channel directly and without additional interface or grain boundary barriers from the solid-state cathode layer to the solid-state anode layer, and vice versa. This may enable very short charging times and large power output of the battery. Furthermore, since these ion channels extend throughout the entire thickness of the layers, complete utilization of the solid-state anode and the solid-state cathode materials in the charge storage may be reached, resulting in high gravimetric capacitance and energy density of the battery.

A predefined crystalline orientation of the solid-state single crystal may enable the use of materials with a strongly non-isotropic ionic conductivity along ion channels oriented perpendicular to the layers.

A thickness of the SSE layer may be much lower than 0.1 mm. The thickness of the SSE layer may be significantly lower than 1 µm. Because of the low thickness of the SSE layer, lower bulk ionic conductivity inside the SSE layer can be tolerated compared to other solid-state battery designs that require larger SSE layer thickness.

The method may be used to produce a Li-ion solid-state battery, a Na-ion solid-state battery, or an H-ion solid-state battery/supercapacitor of which the different functional layers may be grown in steps 310, 320 and 330.

The chemical compositions of the related layers may be different from one and another. Thus, each of the related layers may have a different composition.

The solid-state anode layer, the solid-state electrolyte layer, and the solid-state cathode layer may all be layers of the same solid-state single-crystal. The function of the homo-epitaxial solid-state battery, as shown in FIGS. 1 and 2 may be entirely provided by redox-active elements incorporated into the solid-state anode and solid-state cathode layers, respectively. For example, the SSE does not contain elements with a redox-transition within a potential range defined by the equilibrium redox potentials of the solid-state anode and solid-state cathode layers, respectively.

A single crystal base material of at least two adjacent layers of the anode layer, the electrolyte layer, and the cathode layer may comprise a NASICON crystal structure.

The single crystal base material (of all) of the adjacent layers of the anode layer, the electrolyte layer, and the cathode layer may comprise a NASICON crystal structure.

The single crystal base material comprising the NASICON crystal structure may for example be $Na_{1+x}Zr_2(PO_4)_{3-x}(SiO_4)_x$, where x lies between 0 and 3. This may be an integer number (alternatively, a float value).

A further example for a NASICON crystal structure material may be the Li-ion conductor LATP ($Li_{1.3}Al_{0.3}Ti_{1.7}(PO_4)_3$). The Li-ion conductivity (at room temperature) in this NASICON crystal structure may be $3\times10^{-3}$ S/cm (bulk). A further example for a NASICON crystal structure may be the Na-ion conductor $Na_3Zr_2(SiO_4)_2(PO_4)$. The Na-ion conductivity (at room temperature) in this NASICON crystal structure may be between $4\times10^{-4}$ S/cm and $3\times10^{-3}$ S/cm (bulk).

The method may comprise doping the anode layer with the first redox-active transition metal. The method may further comprise doping the cathode layer with the first redox-active transition metal or with a second redox-active transition metal, which is different from the first redox-active transition metal.

In principle, any element can be a suitable dopant, especially all transition metals: for example titanium (Ti), vanadium (V), chromium (Cr), manganese (Mn), iron (Fe), cobalt (Co), nickel (Ni), yttrium (Y), zirconium (Zr), niobium (Nb), molybdenum (Mo), hafnium (Hf), tantalum (Ta), tungsten (W), lanthanum (La), cerium (Ce), praseodymium (Pr). Depending on the combination, the same dopant can be used for the solid-state anode or for the solid-state cathode.

A single crystal base material of at least two adjacent layers of the anode layer, the electrolyte layer, and the cathode layer may comprise a Perovskite crystal structure.

The single crystal base material (of all) of the anode layer, the electrolyte layer, and the cathode layer may comprise a Perovskite crystal structure.

The single crystal base material comprising the Perovskite crystal structure may be $Li_{2-3x}La_xTiO_3$, where x lies between ½ and ⅔.

For the Perovskite crystal structure material LLTO ($Li_{0.34}La_{0.56}TiO_3$), the Li-ion conductivity (at room temperature) may be between $7\times10^{-5}$ S/cm (total) and $10^{-3}$ S/cm (bulk). For the epitaxial perovskite LLTO ($Li_{0.17}La_{0.61}TiO_3$) film, the Li-ion conductivity (at room temperature) may be $3.76\times10^{-4}$ S/cm (total).

The method may comprise the step of doping the anode layer with the first redox active transition metal. In case of perovskite, co-doping of a redox active transition metal together with an alkaline earth metal (like barium (B a)) may be performed. Consequently, the method may comprise the step of doping the anode layer with the first redox active transition metal and the first alkaline earth metal.

The method may comprise the step of doping the cathode layer with the first redox active transition metal. The method may comprise the step of doping the cathode layer with the first redox active transition metal together with the first alkaline earth metal. The method may comprise the step of doping the cathode layer with the first redox active transition metal together with the second alkaline earth metal. The method may comprise the step of doping the cathode layer with the second redox active transition metal. The method may comprise the step of doping the cathode layer with the second redox active transition metal together with the first alkaline earth metal. The method may comprise the step of doping the cathode layer with the second redox active transition metal together with the second alkaline earth metal.

At least two adjacent layers of the anode layer, the electrolyte layer, and the cathode layer are grown as a homo-epitaxial single crystal using at least one of liquid phase epitaxy (LPE), chemical vapor deposition (CVD), metal-organic chemical vapor deposition (MOCVD), molecular beam epitaxy (MBE), and pulsed laser deposition (PLD).

Further, all layers of the anode layer, the electrolyte layer, and the cathode layer may be grown epitaxially using one of the above deposition processes. The variation in the chemical composition between the different functional layers can be achieved by changing target, background gas, or solution composition at different stages during the deposition process. In this way, all functional layers can be produced/manufactured in a single continuous deposition process without interruption and the formation of structural interfaces can be avoided. LPE may be performed with a low deposition temperature compared to the other deposition techniques. Epitaxial growth of perovskite LLTO may be used on various substrates, e.g. by PLD.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention are described herein with reference to flowchart illustrations and/or block diagrams of methods or apparatus (systems) according to embodiments of the invention. It will be understood that each block of the flowchart illustrations and/or block diagrams, and combinations of blocks in the flowchart illustrations and/or block diagrams, can be implemented by computer readable program instructions.

The flowcharts and/or block diagrams in the figures illustrate the architecture, functionality, and operation of possible implementations of systems or methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Aspects of the invention include an electrochemical energy storage device that includes a solid-state anode layer, a solid-state electrolyte layer, a solid-state cathode layer, wherein at least two adjacent ones out of the solid-state anode layer, the solid-state electrolyte layer, and the solid-state cathode layer form a solid-state single-crystal with varying chemical compositions between the related layers, and wherein the solid-state electrolyte layer has an ionic conductivity at room temperature higher than $10^{-6}$ S/cm.

Aspects of the invention further include the above-described storage device, wherein the energy storage device is a Li-ion solid-state battery or wherein the energy storage device is a Na-ion solid-state battery, or wherein the energy storage device is an H-ion solid-state battery/supercapacitor.

Aspects of the invention further include the above-described storage device, wherein the solid-state anode layer, the solid-state electrolyte layer, and the solid-state cathode layer are layers of the same solid-state single-crystal with each having a different chemical composition.

Aspects of the invention further include the above-described storage device, wherein a base material of at least two adjacent layers of the anode layer, the electrolyte layer, and the cathode layer comprises a NASICON crystal structure.

Aspects of the invention further include the above-described storage device, wherein the base material comprising the NASICON crystal structure is $Na_{1+x}Zr_2(PO_4)_{3-x}(SiO_4)_x$, where x lies between 0 and 3.

Aspects of the invention further include the above-described storage device, wherein the anode layer is doped with a first redox active transition metal; and/or wherein the cathode layer is doped with the first redox active transition metal, or the cathode layer is doped with a second redox active transition metal, which is different from the first redox active transition metal.

Aspects of the invention further include the above-described storage device, wherein a base material of at least two adjacent layers of the anode layer, the electrolyte layer, and the cathode layer comprises a Perovskite crystal structure.

Aspects of the invention further include the above-described storage device, wherein the base material comprising the Perovskite crystal structure is $Li_{2-3x}La_xTiO_3$, where x lies between ½ and ⅔.

Aspects of the invention further include the above-described storage device, wherein the anode layer is doped with at least one of a first redox active transition metal and a first alkaline earth metal; and/or wherein the cathode layer is doped with at least one of the first redox active transition metal, the first alkaline earth metal, a second redox active transition metal, and a second alkaline earth metal.

Aspects of the invention further include a method for manufacturing an electrochemical energy storage device, wherein the method includes growing a solid-state anode layer, growing a solid-state electrolyte layer, growing a solid-state cathode layer, wherein at least two adjacent ones out of the solid-state anode layer, the solid-state electrolyte layer, and the solid-state cathode layer are grown as a solid-state single-crystal with varying chemical compositions between the related layers, and wherein the solid-state electrolyte layer has an ionic conductivity higher than $10^{-6}$ S/cm.

Aspects of the invention further include the above-described method, wherein the energy storage device is a Li-ion solid-state battery or wherein the energy storage device is a Na-ion solid-state battery, or wherein the energy storage device is an H-ion solid-state battery/supercapacitor.

Aspects of the invention further include the above-described method, wherein the solid-state anode layer, the solid-state electrolyte layer, and the solid-state cathode layer are layers of the same solid-state single-crystal, wherein chemical compositions of the related layers are different from one and another.

Aspects of the invention further include the above-described method, wherein a base material of at least two adjacent layers of the anode layer, the electrolyte layer, and the cathode layer comprises a NASICON crystal structure.

Aspects of the invention further include the above-described method, wherein the base material comprising the NASICON crystal structure is $Na_{1+x}Zr_2(PO_4)_{3-x}(SiO_4)_x$, where x lies between 0 and 3.

Aspects of the invention further include the above-described method further including doping the anode layer with a first redox active transition metal, and/or doping the cathode layer with the first redox active transition metal or with a second redox active transition metal, which is different from the first redox active transition metal.

Aspects of the invention further include the above-described method, wherein a base material of at least two adjacent layers of the anode layer, the electrolyte layer, and the cathode layer comprises a Perovskite crystal structure.

Aspects of the invention further include the above-described method, wherein the base material comprising the Perovskite crystal structure is $Li_{2-3x}La_xTiO_3$, where x lies between ½ and ⅔.

Aspects of the invention further include the above-described method further including doping the anode layer with at least one of a first redox active transition metal and a first alkaline earth metal, and/or doping the cathode layer with at least one of the first redox active transition metal, the first alkaline earth metal, a second redox active transition metal and a second alkaline earth metal.

Aspects of the invention further include the above-described method, wherein at least two adjacent layers of the anode layer, the electrolyte layer, and the cathode layer are grown as a homo-epitaxial single crystal using at least one of LPE, CVD, MOCVD, MBE, and PLD.

What is claimed is:

1. A method for manufacturing an electrochemical energy storage device, the method comprising:
   growing a solid-state anode layer;
   growing a solid-state electrolyte layer;
   growing a solid-state cathode layer;
   wherein the solid-state anode layer, the solid-state electrolyte layer, and the solid-state cathode layer are epitaxially grown as a homo-epitaxial single-crystal using at least one of LPE, CVD, MOCVD, MBE, and PLD such that the homo-epitaxial single-crystal comprises a monolithic single crystal without structural interfaces,
   wherein a base material of the monolithic single crystal comprises a NASICON crystal structure,
   wherein the NASICON crystal structure is $Na_{1+x}Zr_2(PO_4)_{3-x}(SiO_4)_x$, where x lies between 0 and 3;
   doping the homo-epitaxial single-crystal to form spatially varying chemical compositions that define at least two layers; and
   wherein the solid-state electrolyte layer has an ionic conductivity higher than $10^{-6}$ S/cm.

2. The method according to claim 1, wherein the energy storage device is a Na-ion solid-state battery.

3. The method according to claim 1 further comprising:
   doping the anode layer with a first redox active transition metal; and
   doping the cathode layer with the first redox active transition metal or with a second redox active transition metal, which is different from the first redox active transition metal.

* * * * *